United States Patent [19]

Isaman

[11] 4,430,708
[45] Feb. 7, 1984

[54] DIGITAL COMPUTER FOR EXECUTING INSTRUCTIONS IN THREE TIME-MULTIPLEXED PORTIONS

[75] Inventor: David L. Isaman, La Jolla, Calif.

[73] Assignee: Burroughs Corporation, Detroit, Mich.

[21] Appl. No.: 266,599

[22] Filed: May 22, 1981

[51] Int. Cl.³ .............................................. G06F 9/28
[52] U.S. Cl. .................................................. 364/200
[58] Field of Search ......... 364/200 MS Files, 900 MS Files

[56] References Cited

U.S. PATENT DOCUMENTS

| | | | |
|---|---|---|---|
| 3,689,895 | 9/1972 | Kitamura | 364/200 |
| 4,103,326 | 7/1978 | Shenfield | 364/200 |
| 4,197,579 | 4/1980 | Otis, Jr. et al. | 364/200 |
| 4,229,790 | 10/1980 | Gilliland et al. | 364/200 |

*Primary Examiner*—Thomas M. Heckler
*Attorney, Agent, or Firm*—Charles J. Fassbender; J. Ronald Richbourg; Kevin R. Peterson

[57] ABSTRACT

Disclosed is a digital computer that includes a memory means in which each of the instructions that the computer executes is represented by first, second, and third sets of microcommands. For any one particular instruction, the first set of microcommands is executed before the second set and the second set is executed before the third set. But the computer also includes a control means which directs the execution of the microcommand sets such that between the execution of the first and second microcommand sets for one instruction there is executed the third microcommand set for a prior instruction, and between the execution of the second and third microcommand sets for that same one instruction there is executed the first microcommand set for a subsequent instruction.

9 Claims, 11 Drawing Figures

$S_a$  RDTOS-1→OQ, JUMP COM $S_b$  SOV+1→SOV, JUMP $S_a^{i-1}$ $S_c$  IQ⊕TOS→TOS, JUMP $S_b^{i-2}$

FIG. 6A.

BEFORE  "FETCH SIMPLE VARIABLE"  AFTER

FIG. 6B.

$S_a$  RDV ⟶ OQ, JUMP COM

$S_b$  WRTOS-1 ⟶ OQ, JUMP +1
TOS ⟶ OQ, JUMP +1
SOV-1 ⟶ SO V, JUMP $S_a^{i-1}$ $S_c$  IQ ⟶ TOS, JUMP $S_b^{i-2}$

DIGITAL COMPUTER FOR EXECUTING INSTRUCTIONS IN THREE TIME-MULTIPLEXED PORTIONS

BACKGROUND OF THE INVENTION

This invention relates to the architecture of digital computers, and more particularly it relates to the control circuitry in a digital computer which directs the sequence by which instructions are executed within the computer.

In general, the instructions which a digital computer executes are stored in a memory. Also, those instructions in the memory are arranged in a particular sequence called a program. And the computer must execute those instructions in that sequence in order to obtain the correct results.

Thus, a common sequence by which a digital computer operates is to fetch one instruction from the memory, then execute that instruction, then fetch the next instruction from memory, then execute that instruction, etc. This sequence is used, for example, in the IBM System/360, Model 50. See *Microprogramming, Principles and Practices*, 1970, page 34 by Samir S. Husson.

Also, the instructions generally call for operands to be fetched from and stored into the memory. Thus, on a more detailed level, the above instruction execution sequence is performed as follows. First, the digital computer fetches one instruction from the memory. Next the computer interprets that instruction. Next the computer fetches any operands that are required from the memory. Next, the computer performs arithmetic operations on those operands. And, next the computer stores the results back in the memory. This sequence is then repeated for the next instruction.

One problem, however, with the above instruction execution sequence is that the time that it takes to read an instruction or an operand from the memory is generally larger than the time that it takes the digital computer to perform an internal arithmetic operation on two operands. As one typical example, the memory read time may be one microsecond; whereas the digital computer internal cycle time may be only 0.1 microseconds. Thus, in the above described instruction sequence, the digital computer spends most of its time doing nothing because it must wait for the memory to supply its requested instructions and operands.

One obvious solution to the above problem is to simply use the fastest memories that technology has to offer. But this solution is unattractive because the cost of the highest speed memories is always substantially greater than the cost of slower memories. Thus, the solution is too expensive for many marketing needs.

Another solution is to construct the digital computer's control circuitry such that the computer executes several different programs in a time-multiplexed fashion. See for example, U.S. Pat. No. 3,980,992 to Levy et al. In a multiprogrammed computer, the computer can execute the first program until a memory read is made. At that point, the computer must stop executing the first program and start executing the second program. Execution of the second program can continue until a memory read for that program is made. Then the computer must start executing the third program. This sequence can continue until a memory read is made in the last program; in which case, the computer switches back to the first program and continues executing it from the point where it previously stopped.

In this manner, the digital computer has useful work to perform between its initiation of a read from the memory and the receipt of the requested information. Thus, efficient use is made of the computer's time, even though the memory is relatively slow.

But a problem with the above sequence is that it works only if there are multiple programs to be performed simultaneously. That is, the computer is inefficient if there is only one program to be performed. Also, the memory must be large enough to contain all of the programs at one time. And a larger memory adds to the cost of the system. Further, extra hardware is required in the digital computer to keep track of the state of each of the programs; and this also adds to the cost of the system. For example, in the computer of U.S. Pat. No. 3,980,992, separate sets of registers are required for each program that is being executed.

Another solution to the above problem is to construct the digital computer's control circuitry so that various portions of more than one instruction in a single program are processed in a time-interleaved sequence. For example, the computer may initiate the read for the next instruction that it is to perform prior to interpreting and executing the present instruction. Thus, that next instruction will be available from the memory when the time comes to perform it. This sequence is used, for example, in the IBM 7094. See *Introduction to Computer Architecture*, 1975, pages 383-384.

Some prior art computers go a step further by dividing the execution phase of each instruction into one portion which fetches operands and another portion which operates on those operands. Then, those portions for two different instructions are interleaved and overlapped. See, for example, "Directions and Issues in Architecture and Language", by Michael J. Flynn, *Computer*, October 1980, page 10.

Figure 7A:
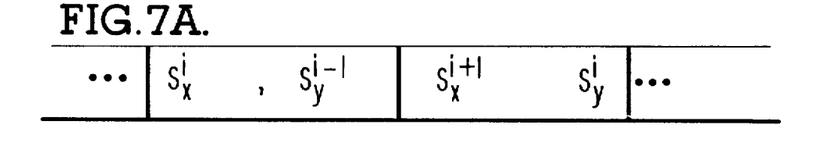
FIGS. 7A and 7B illustrate alternative time-multiplexed instruction execution sequences which are contrary to the teachings of the present invention.
Figure 7B:
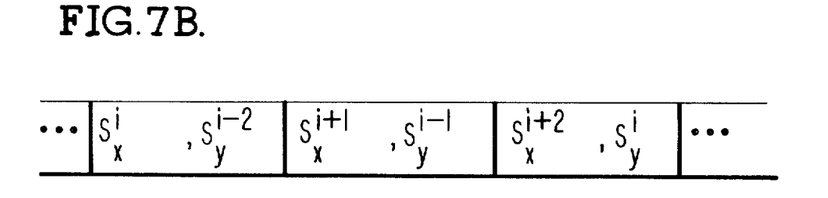

However, both of these interleaving sequences also have severe limitations, as is discussed herein in conjunction with FIGS. 7A and 7B of the Detailed Description. Accordingly, it is a primary object of this invention to provide an improved digital computer which overcomes all of the above problems.

BRIEF SUMMARY OF THE INVENTION

This object and others are achieved in accordance with the invention by a digital computer which includes a memory means in which each of the instructions is represented by first, second, and third sets of microcommands where the first set of microcommands must be executed before the second set and the second set must be executed before the third set. The computer further includes a control circuit which executes, in a time-multiplexed iterative sequence, the third set of microcommands for a first instruction in the program, followed by the second set of microcommands for a second instruction in the program after the first instruction, followed by the first set of microcommands for a third instruction in the program after the second instruction.

BRIEF DESCRIPTION OF THE DRAWINGS

Various features and advantages of the invention will best be understood by reference to the following detailed description and accompanying drawings wherein.

DETAILED DESCRIPTION OF THE INVENTION

Figure 1:
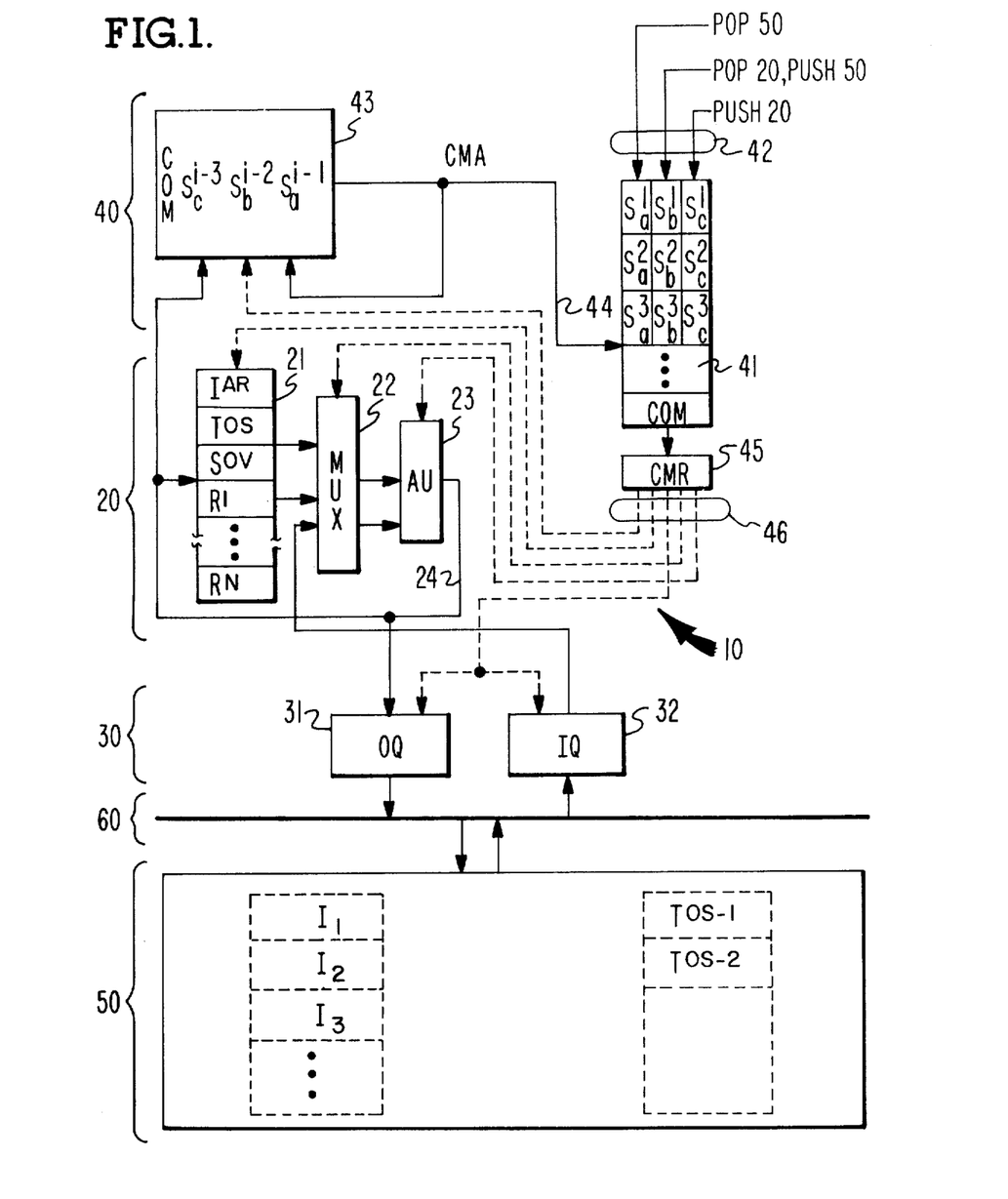
FIG. 1 illustrates one preferred embodiment of a digital computer that is constructed in accordance with the invention.

Referring now to FIG. 1, one preferred embodiment of a digital computer 10 that is constructed in accordance with the invention will be described. In general, computer 10 is comprised of an arithmetic section 20, an input/output section 30, and a control section 40. Arithmetic section 20 operates to perform functions on operands as specified by instructions; input/output section 30 operates to fetch those instructions and operands; and control section 40 operates to sequence the execution of those instructions by directing the operation of arithmetic section 20 and input/output section 30.

Those instructions that are to be performed are stored in a memory 50 which couples to input/output section 30 via a bus 60. In memory 50, the instructions are represented by the symbols $I_1, I_2, I_3 \ldots$. From a programmer's point of view, instructions $I_1, I_2, I_3 \ldots$ form an instruction string in a program wherein the first instruction $I_1$ is completely executed, then the next instruction $I_2$ is completely executed, then the next instruction $I_3$ is completely executed, etc.

But in the present invention, control section 40 divides each of those instructions into three parts and executes those parts for several different instructions in a time-interleaved sequence. To the programmer it appears that instructions $I_1, I_2, \ldots$ are still being executed one-at-a-time. But due to the interleaving, the time it takes to execute the instruction strings in the program is substantially reduced.

Consider now in greater detail the makeup of each of the sections 20, 30, and 40. First, as illustrated in FIG. 1, section 20 includes a register file 21, a multiplexer 22, and arithmetic unit 23. These components are interconnected in a serial fashion such that in one cycle of computer 10, operands in register file 21 are selectively passed through multiplexer 22 to arithmetic unit 23; and the result from arithmetic unit 23 is sent via a bus 24 back to one of the resisters in file 21.

Some of the registers in file 21 are defined as follows. Register IAR is an instruction address register which addresses one of the instructions $I_1, I_2, I_3 \ldots$ in memory 50. Register TOS is a top of stack register which holds one operand. All of the remainder of the stack is contained in memory 50. There, symbol TOS-1 indicates the top of stack minus one; symbol TOS-2 indicates the top of stack minus two; etc.

Register SOV is a stack overflow register which is incremented or decremented each time the stack is popped or pushed to keep track of the number of vacancies in the stack. And registers R1, ..., RN are general purpose registers which are utilized to store various items such as addresses for memory 50 or intermediate results of arithmetic operations.

Section 30 of computer 10 includes an output queue 31 and an input queue 32. Output queue 31 operates to receive messages from the arithmetic section 20 for transmission to memory 50; and it operates to buffer those messages until they are actually sent over the bus 60. Those messages, for example, include a request for an instruction from memory 50, a request for data from the stack portion in memory 50, or the transmission of data for storage in the stack portion in memory 50.

Input queue 32 operates to receive messages from memory 50 over bus 60; and it holds those messages until they are needed by arithmetic unit 20. Those messages from bus 60 include instructions which were previously requested by the output queue.

Of course, some time interval $\Delta T1$ must occur between the sending of a request for data from output queue 31 and the receipt of that data in input queue 32. And that time interval must necessarily be several times larger than the time interval $\Delta T2$ that it takes to pass data from register file 21 through multiplexer 22 and arithmetic unit 23 back to the register file.

Typically, time interval $\Delta T1$ is five to ten times larger than time interval $\Delta T2$. The exact multiple depends upon the speed of memory 50 and the contention for bus 60 from other devices (not shown). Thus, it is highly desirable for computer 10 to have some useful tasks to perform between the requesting of data via output queue 31 and the receipt of that data on input queue 32. Otherwise, computer 10 will have to wait and do nothing until the data arrives.

To address this problem, control section 40 includes a control memory 41 in which each of the instructions $I_1, I_2, I_3 \ldots$ is represented by three sets of microcode $S_A$, $S_B$, and $S_C$. Those microcode sets which implement instruction $I_1$ are indicated in control memory 41 as $S_A^1$, $S_B^1$, and $S_C^1$; those microcode sets which implement instruction $I_2$ are indicated as $S_A^2$, $S_B^2$, and $S_C^2$; etc.

One constraint for the microcode sets $S_A$, $S_B$, and $S_C$ is that for any particular instruction, microcode in set $S_A$ must be performed before microcode in set $S_B$, and microcode in set $S_B$ must be performed before the microcode in set $S_C$. But this does not mean that the microcode in sets $S_A$, $S_B$, and $S_C$ for each particular instruction must be performed immediately after one another. And in the present invention, the execution of the microcode in sets $S_A$, $S_B$, and $S_C$ for each particular instruction is interleaved with the execution of microcode sets for other instructions.

Another constraint on the microcode sets $S_A$, $S_B$, and $S_C$ is that set $S_A$ microcode performs pops from that portion of the stack that resides in memory 50, set $S_B$ microcode performs pops on that portion of the stack that resides in arithmetic unit 20 and performs pushes on that portion of the stack that resides in memory 50; and set $S_C$ microcode performs pushes on that portion of the stack that resides in arithmetic unit 20. These constraints are indicated by reference numeral 42 in FIG. 1.

Control memory 41 also includes one common set of microcode COM; and it operates to send requests for instructions via output queue 31 and to receive those requested instructions on input queue 32. This common set of microcode is executed along with the above-described microcode sets $S_A$, $S_B$, and $S_C$ in a time-multiplexed iterative sequence which is herein represented symbolically as COM, $S_C{}^{i-3}$, $S_B{}^{i-2}$, $S_A{}^{i-1}$.

To execute microcode in this iterative sequence, control section 40 includes a control memory addressing circuit 43. In operation, circuit 43 first forms control memory addresses CMA for the common microcode sets; then it forms addresses for microcode set $S_C$ of instruction $I_{i-3}$; then it forms addresses for microcode set $S_B$ of instruction $I_{i-2}$; and then it forms addresses of microcode set $S_A$ of instruction $I_{i-1}$. That sequence is then repeated over and over with the variable i being updated by one each time.

Each address formed by circuit 43 is sent over bus 44 to select a corresponding microcommand from control memory 41; and that command is loaded into a control memory register 45. From there, various portions of the microcommand are coupled via leads 46 to control the operation of arithmetic unit 20, input/output unit 30, and control memory addressing circuit 43.

Figure 2:
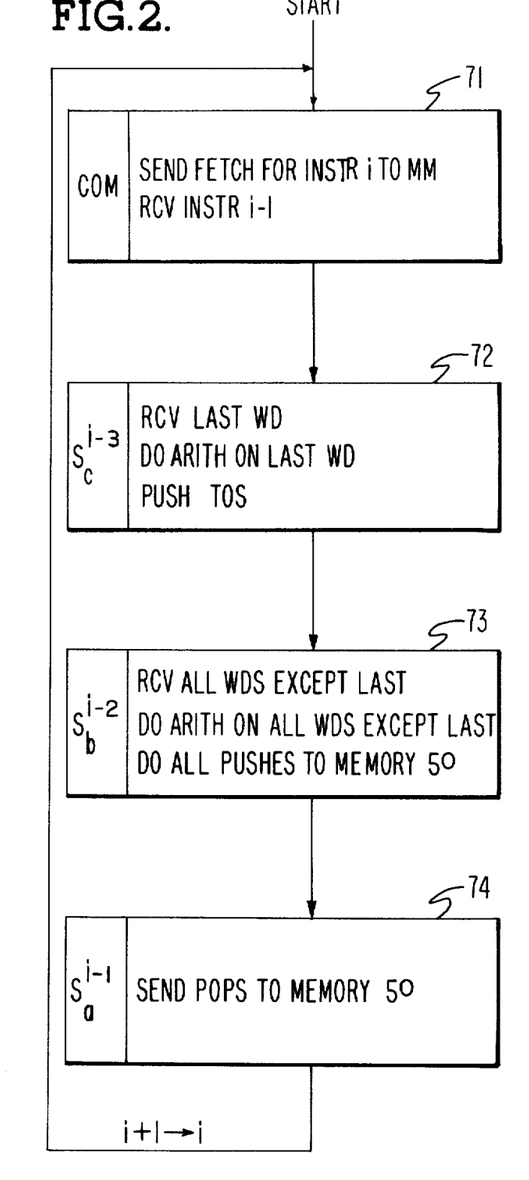
FIG. 2 illustrates the iterative time-multiplexed instruction execution sequence in the FIG. 1 computer.
Figure 3:
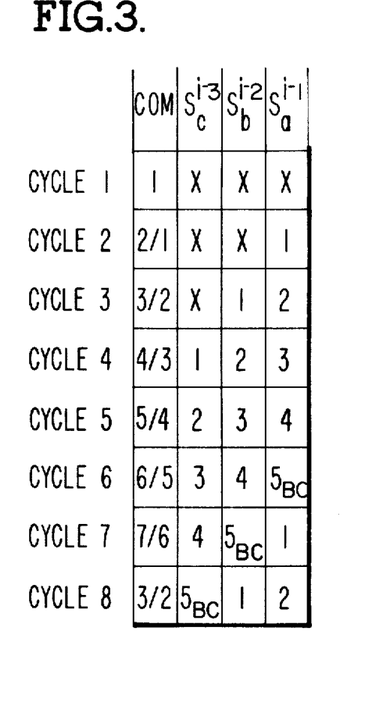
FIG. 3 further illustrates the iterative time-multiplexed instruction execution sequence in the FIG. 1 computer.

Reference should now be made to FIGS. 2 and 3 where the iterative time-multiplexed operation of computer 10 is illustrated in greater detail. Consider first FIG. 2. There, block 71 indicates that computer 10 begins its iterative time-multiplexed operation by executing the common set of microcode COM. That microcode sends a fetch via output queue 31 for instruction I in memory 50; and it takes instruction $I_{i-1}$ from input queue 32. Note that instruction $I_{i-1}$ was fetched in a previous pass through the iterative sequence.

Next, as indicated in block 72, computer 10 executes microcode in set $S_C$ of instruction $I_{i-3}$. That microcode takes the last word that is to be operated on from input queue 32, performs any arithmetic operations that are required on that last word and any register in file 21, and pushes the result onto the top of stack register TOS. Here again, the data that is being taken from input queue 32 was fetched in a previous pass through the iterative sequence.

Next, as indicated in block 73, microcode in set $S_B$ for instruction $I_{i-2}$ is executed. That microcode takes from input queue 32 all words from the stack in main memory 50 that are to be operated on except the last word. Also, it performs arithmetic operations on those words and performs all pushes via output queue 31 to the stack in memory 50. Again, the data that is here taken from input queue 32 has been fetched in a previous pass through the iterative cycle.

Next, as indicated by block 74, microcode in set $S_A$ for instruction $I_{i-1}$ is executed. That microcode sends pop commands via output queue 31 to the stack in memory 50. That is, operands which are required by instruction $I_{i-1}$ from the stack portion in memory 50 are fetched by this set of microcode. Thereafter, the indexing variable i is updated by one; and the iterative sequence is repeated.

One attractive feature of this operating sequence is that computer 10 always has some useful work to perform between the fetching of an instruction from memory 50 via output queue 31 and the receipt of that instruction on the input queue. In particular, as can be seen by inspection of FIG. 2, computer 10 fetches instruction $I_i$ in block 71 and then it performs all of the tasks indicated in blocks 72, 73, and 74 before it is ready to receive the fetched instruction. Thus, computer 10 is not simply waiting for the fetched instruction to come back from memory 50.

Another attractive feature of the above operating sequence is that computer 10 always has something to do between the fetching of operands from the stack in memory 50 and the receipt of those operands in input queue 32. Inspection of FIG. 2 shows that operands from the stack in memory 50 are popped in block 74; but they are not used until the following block 73. Thus, computer 10 performs all of the tasks indicated in blocks 71 and 72 between its request for an operand from the stack of memory 50 and the actual receipt of that operand.

Further, for short instructions which require only one operand to be popped from the stack in memory 50, two complete passes through the iterative sequence are made before that popped operand is operated on. That is, after a one operand pop in block 74, that operand will not be operated on by computer 10 until one complete pass is made through blocks 71, 72, 73 and 74 and another pass is made through block 71. This is important because a large percentage of stack-oriented instructions operate on only the top of stack and top of stack minus one operands.

Another important point in the above-described sequential operation of computer 10 is that all pops from the stack in memory 50 by any one instruction are made after all pushes to the stack in memory 50 by the preceding instructions. This is evident by inspection of blocks 73 and 74 in FIG. 2 wherein all pushes to the stack in memory 50 for instruction $I_{i-2}$ are performed in block 73 and any pops from the stack in memory for instruction $I_{i-1}$ are performed in block 74. If some of the pushes to the stack in memory 50 for instruction $I_{i-2}$ occur after the pops from the stack in memory 50 for instruction $I_{i-1}$, those pops would be fetching stale data which, of course, would produce errors.

Still another important feature of the above operation of computer 10 is that all pushes to the stack in memory 50 by any one instruction occur after all arithmetic operations are complete by the preceding instruction. This is evident by inspection of blocks 72 and 73 wherein in box 72 arithmetic operations are completed for instruction $I_{i-3}$ and in block 73 pushes to the stack in memory 50 begin for instruction $I_{i-2}$. If some of the pushes to the stack in memory 50 for instruction $I_{i-2}$ began before all of the arithmetic operations for instruction $I_{i-3}$ were complete, then some of the data being pushed onto the stack would be stale, which again would cause errors.

Referring now to FIG. 3, the sequence by which computer 10 executes instructions $I_1$, $I_2$, ... is illustrated in still another form. FIG. 3 includes a matrix having columns labelled COM, $S_C$, $S_B$, and $S_A$; having rows labelled CYCLE 1 through CYCLE 8; and having numbers in the various row-column locations which indicate the instruction that is being executed. Computer 10 executes the labelled microcode sets for one cycle in a left to right sequence; then it executes the labelled microcode sets for the next cycle in a left to right sequence; etc.

Starting with cycle four, for example, computer 10 first executes the common set of microcode COM which fetches instruction 4 via output queue 31 and receives instruction 3 in input queue 32. Next, computer 10 executes microcode set $S_C$ for instruction 1; then it executes microcode set $S_B$ for instruction 2; and then it executes microcode set $S_A$ for instruction 3. Next, the common microcode set is executed wherein a fetch for instruction 5 is sent and instruction 4 is received. Then microcode set $S_C$ for instruction 2 is executed; then microcode set $S_B$ for instruction 3 is executed; then microcode set $S_A$ for instruction 4 is executed, etc.

Also, for completeness, cycles 1-3 indicate the operation of computer 10 when it is first powered on. There, some of the microcode sets must be skipped, as indicated by the Xs in the matrix, because there are no prior instructions to operate on. But this skipping only occurs once (at POWER ON); and so its effect on the computer's performance is insignificant.

FIG. 3 also shows the operation of computer 10 when one of the instructions $I_1$, $I_2$, $I_3$, ... is a branch conditional instruction. If the branch is not taken, then computer 10 merely sequences as was described above in conjunction with cycles 4 and 5. But if the branch is taken, then computer 10 operates in a slightly different fashion as indicated by cycles 6, 7, and 8. There it is assumed that the fifth instruction is the branch conditional instruction and that the condition to be tested is such that the branch is taken.

Now a branch instruction can test a condition that is set up by the previous instruction, which in this case is instruction 4. But instruction 4 does not complete its execution until cycle 7; and thus microcode set $S_B$ for the branch instruction can test that condition. If the branch is to be taken, then microcode set $S_B$ for the branch instruction fetches both the instruction to be branched to and the following instruction. In FIG. 3, those two instructions are assumed to be instruction 1 and 2.

Also, microcode set $S_B$ for the branch removes any other pre-fetched instructions from the input queue (which in FIG. 3 are instructions 7 and 6). Then it takes the instruction that is being branched to from the input queue and branches to microcode set $S_A$ for that instruction. Thereafter, the sequence continues as was described above. Microcode sets $S_A$ and $S_C$ for the branch instruction merely are one microcommand which branches to the next microcode set in the sequence.

One preferred embodiment of control memory addressing circuit 43 will now be described in detail in conjunction with FIG. 4. That addressing circuit includes registers 81, 82, and 83 which are interconnected to each other in a serial fashion. Register 81 receives its inputs from arithmetic section 20 on bus 24; register 82 receives its inputs from register 81; and register 83 receives its inputs from register 82.

In operation, instruction $I_{i-1}$ is transferred from input queue 32 to register 81 by the common microcode COM. At the same time, the previous contents of register 81 are transferred to register 82 and the previous contents of register 82 are transferred to register 83. That operation is performed each time the common microcode is executed.

Three memories 84, 85, and 86 are also included in the addressing circuit 43. Memories 84, 85, and 86 are addressed respectively by registers 81, 82, and 83. Outputs from those memories are sent to a multiplexer 87 whose output forms the address CMA for control memory 41 on bus 44.

Memory 84 stores the beginning addresses for the microcode sets $S_A$ for all of the instructions. And since memory 84 is addressed by instruction $I_{i-1}$, the output of memory 84 is the beginning address for microcode set $S_A$ of instruction $I_{i-1}$. Similarly, memory 85 stores the beginning addresses for microcode set $S_B$ of all of the instructions; and memory 86 stores the beginning address for microcode set $S_C$ for all of the instructions.

And since memories 85 and 86 are respectively addressed by instructons $I_{i-2}$ and $I_{i-3}$, their respective outputs are the beginning addresses for microcode set $S_B$ of instruction $I_{i-2}$ and the beginning address of microcode set $S_C$ for instruction $I_{i-3}$.

To enter a particular microcode set for one of the instructions, control signals on leads 46 from the control memory register are sent to multiplexer 87 to select the outputs from one of the memories 84, 85, and 86. Then, after the microcode set has been entered, that control memory address is incremented or decremented by an adder circuit 88 in response to control signals on leads 46. Test conditions on bus 24 are also sent to adder circuit 88 to permit testing and branching within each of the microcode sets.

Figure 5A:
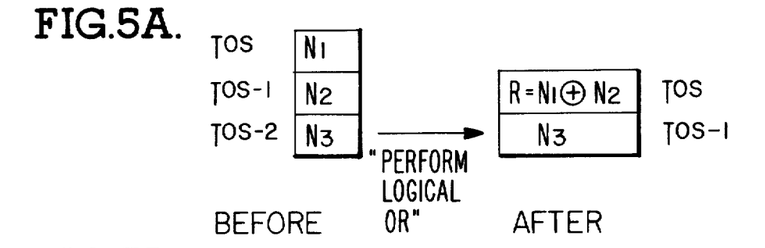
FIGS. 5A and 5B illustrate three sets of microcommands that comprise one instruction in the control memory of the FIG. 1 computer.

This operation may better be understood by reference to FIGS. 5A-6B wherein the actual microcode sets $S_A$, $S_B$, and $S_C$ for two instructions are illustrated. In particular, FIG. 5A illustrates the microcode sets for a "logical OR instruction". Before that instruction is performed, the stack is as indicated in the left-hand portion of FIG. 5A wherein N1, N2, and N3 are the top three entries in the stack. Then, after the instruction is performed, the top of stack entry is the result R that is obtained by logically ORing N1 and N2; and the next entry in the stack is N3.

Figure 4:
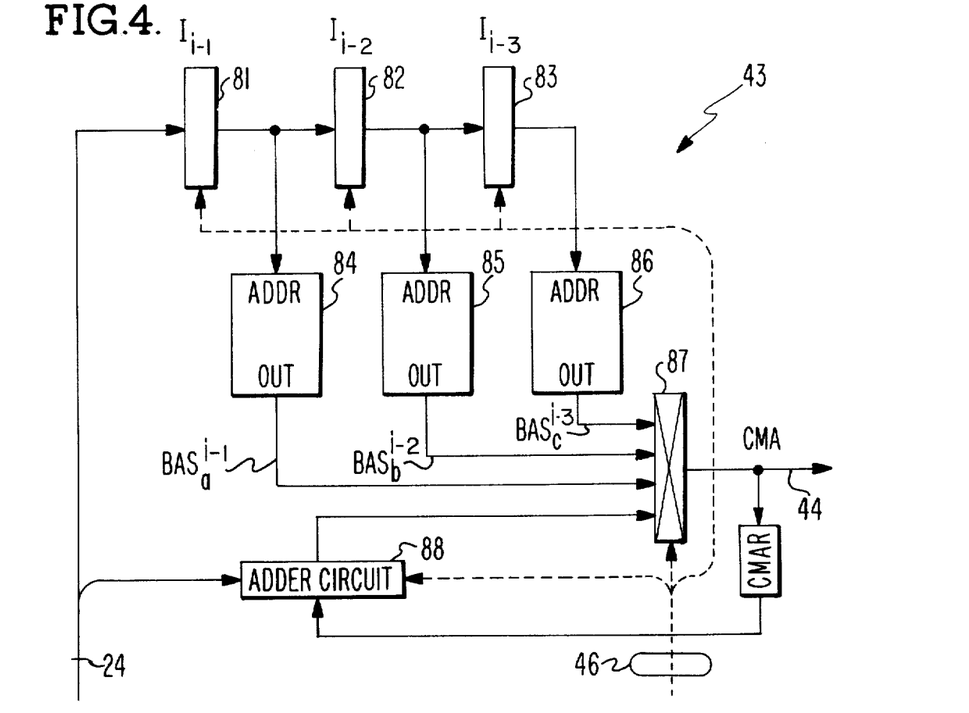
FIG. 4 illustrates in greater detail one preferred embodiment of the control memory addressing circuitry in the FIG. 1 computer.
Figure 5B:
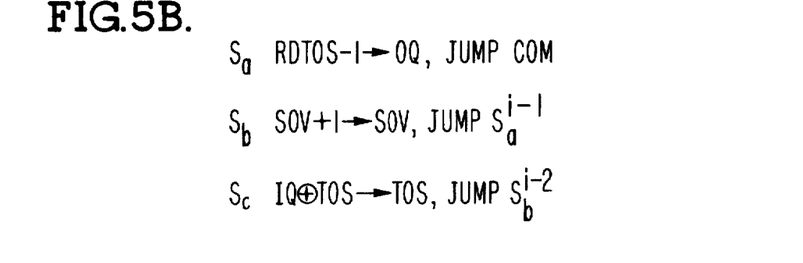

This operation is achieved by the microcode sets $S_A$, $S_B$, and $S_C$ of FIG. 5B. In $S_A$, a request is sent via output queue 31 for the top of stack minus one operand in memory 50 to be read; and a jump is taken to the common set of microcode. That jump is in accordance with the previously described iterative sequences of FIGS. 1-4.

Microcode set $S_B$ adds one to the stack overflow register; and it jumps to microcode set $S_A$ for instruction $I_{i-1}$. This jump is achieved by selecting the output of memory 84 as the control memory address on leads 44; and it too is in accordance with the previously described sequences of FIGS. 1-4.

Microcode set $S_C$ ORs the input queue with the top of stack register; stores the result in the top of stack register; and jumps to microcode set $S_B$ for instruction $I_{i-2}$. That jump is achieved by selecting the output of memory 85 as the control memory address on leads 44. Note that the output of memory 86 is not called for in these sets $S_A$, $S_B$, or $S_C$ because that occurs at the end of the common microcode routine.

Figure 6A:
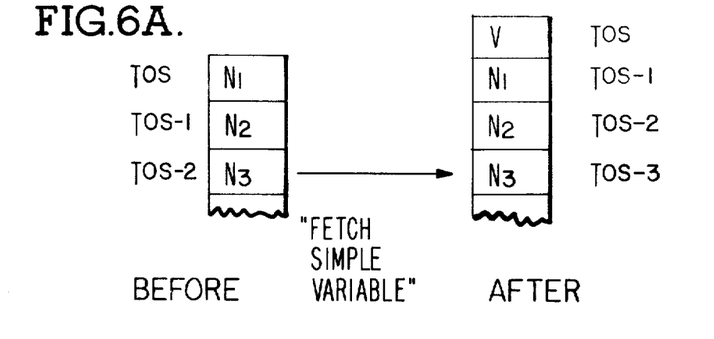
FIGS. 6A and 6B illustrate three sets of microcommands that comprise another instruction in the control memory of the FIG. 1 computer.
Figure 6B:
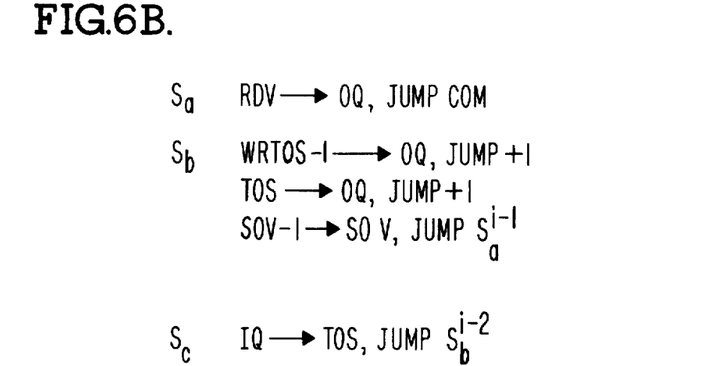

FIGS. 6A and 6B illustrate microcode sets $S_A$, $S_B$, and $S_C$ for the "fetch simple variable" instruction. That instruction operates to fetch a variable from memory 50 and to put it on the top of stack. This operation is indicated in FIG. 6A.

To implement this operation, microcode set $S_A$ sends a command to memory 50 via output queue 31 which says read the variable V; and it jumps to the common microcode routine. Microcode set $S_B$ sends a command to memory 50 via output queue 31 which says write into the top of stack minus one location. Then the top of stack register is loaded into the output queue so that it can be transferred to memory 50.

Then the stack overflow register is updated, and a jump is taken to microcode set $S_A$ of instruction $I_{i-1}$. Next, in microcode set $S_C$, the variable V that was requested by the microcode set $S_A$ is taken from input queue 32 and loaded into the top of stack register. Then a jump is taken to microcode set $S_B$ of instruction $I_{i-2}$.

For comparison purposes, some alternative microcode interleaving sequences will now be considered in conjunction with FIGS. 7A and 7B. There, each instruction is divided into only two microcode sets, $S_X$ and $S_Y$. In the sequence of FIG. 7A, microcode set $S_X$ for instruction $I_i$ is executed first; then microcode set $S_Y$ for instruction $I_{i-1}$ is executed; and then the sequence repeats. And in the sequence of FIG. 7B, microcode set $S_X$ for instruction $I_i$ is executed; then microcode set $S_Y$ for instruction $I_{i-2}$ is executed; and then the sequence repeats.

It will now be shown that these interleaving sequences, and any other interleaving sequence wherein each instruction is divided into only two microcode sets, simply will not work for stack-oriented instructions. In a stack-oriented machine, virtually every instruction pops one or more operands from the stack in memory 50. Also, virtually every instruction modifies the TOS register in file 21. Many instructions, like that in FIG. 5, do almost nothing else. Therefore, for those instructions to benefit from being divided into two microcode sets $S_X$ and $S_Y$, $S_X$ must pop from memory 50 and $S_Y$ must modify the TOS register.

Some instructions are like that in FIG. 6, in that they push the contents of the TOS register onto the stack in memory 50. Consider when that push could be done for instruction $I_i$. It must be done before the pop in instruction $I_{i+1}$. Otherwise, as explained in conjunction with FIG. 2, that pop will produce the wrong item. The first pop in instruction $I_{i+1}$ is done in $S_X^{i+1}$, so the push in instruction $I_i$ must precede that.

The push in instruction $I_i$ of TOS must follow $S_Y^{i-1}$, wherein TOS is modified. Otherwise, stale data will be pushed onto the stack, as was also described previously in conjunction with FIG. 2. Therefore, the push in instruction $I_i$ must both follow $S_Y^{i-1}$ and precede $S_X^{i+1}$.

But as can be seen from FIG. 7A, no portion of instruction $I_i$ occurs between $S_Y^{i-1}$ and $S_X^{i+1}$. Further, in the sequence of FIG. 7B (and by induction any other sequences) microcode set $S_X$ of instruction $I_{i+1}$ does not even follow microcode set $S_Y$ of instruction $I_{i-1}$. Therefore, any prior art time-multiplexed interleaving sequence in which instructions are divided into only two sets of microcode simply will not work.

Figure 8:
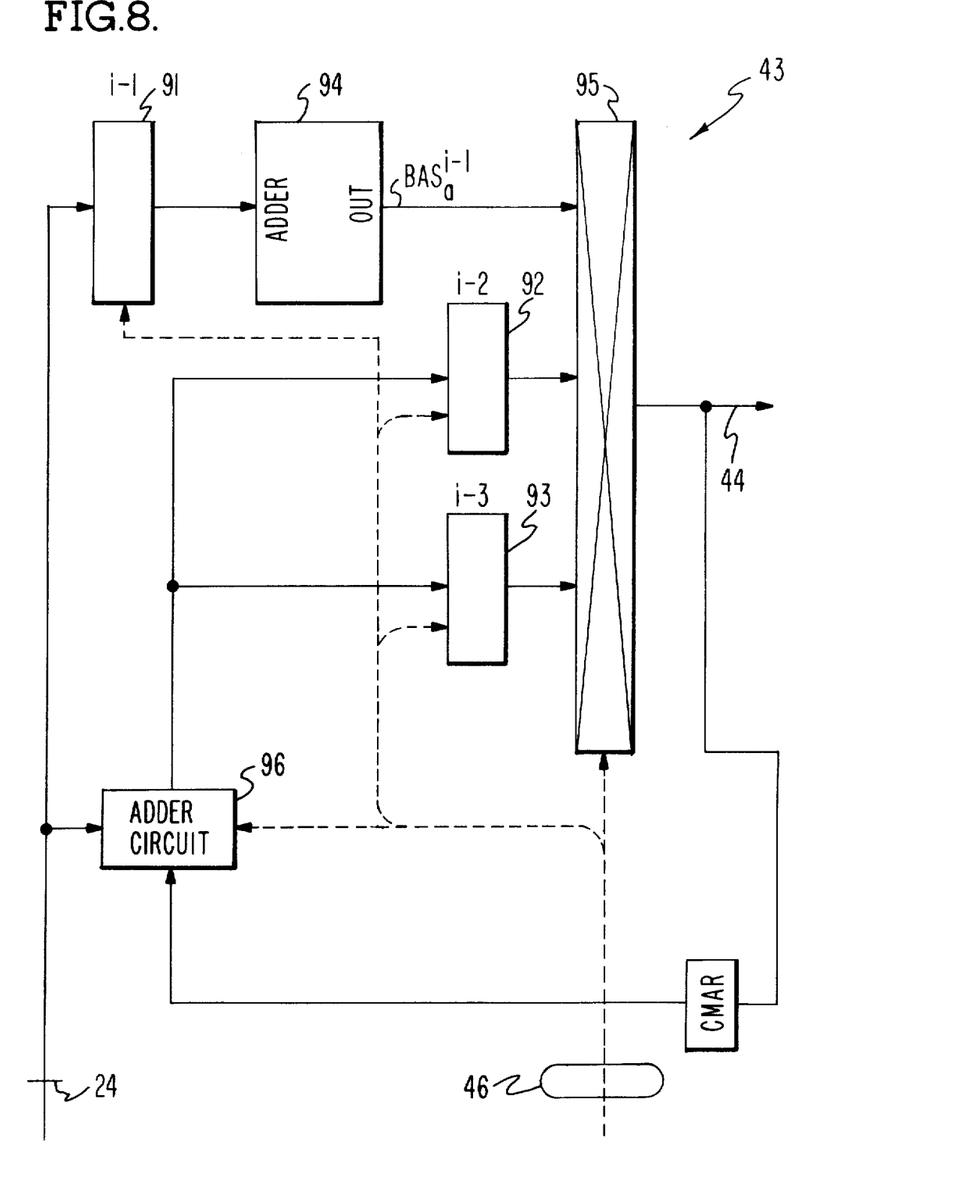
FIG. 8 illustrates in greater detail one other preferred embodiment of the control memory addressing circuitry in the FIG. 1 computer.

Referring next to FIG. 8, another preferred embodiment of the control memory addressing circuit 43 will be described. This memory addressing circuit includes three registers 91, 92, and 93. Register 91 receives its inputs from bus 24; and its outputs address a memory 94. That memory has its outputs coupled to a multiplexer 95; and the output of multiplexer 95 forms the control memory address CMA on bus 44.

Memory 94 stores the beginning addresses of all of the microcode sets $S_A$ for all of the instructions. In operation, the common routine loads instruction $I_{i-1}$ into register 91; and thus the output memory 94 is the beginning address of microcode set $S_A$ for instruction $I_{i-1}$. That address is selectively passed through multiplexer 94 in response to control signals on bus 46 from the last microcommand in set $S_B$.

After microcode set $S_A$ is entered, an adder circuit 96 is utilized to increment and conditionally modify the control memory address CMA as was previously described in conjunction with the FIG. 4 circuit. Then, when execution of the microcode in set $S_A$ is complete, a jump is taken to the common microcode set; and in addition, register 92 is loaded with the beginning address of microcode set $S_B$ for the instruction whose $S_A$ microcode is being exited. That beginning address in this embodiment is formed by adder circuit 96.

Similarly, at the end of the execution of microcode in set $S_B$, an address is generated by the adder circuit 96 which is stored in register 93. That address is the beginning address for microcode set $S_C$ for the instruction whose $S_B$ microcode is being exited. Thus, in this FIG. 8 embodiment of addressing circuit 43, microcode sets $S_A$ and $S_B$ respectively form the beginning addresses for sets $S_B$ and $S_C$, which eliminates the need for three memories 84, 85, and 86 as in the FIG. 4 embodiment.

Various preferred embodiments of the invention have now been described in detail. In addition, however, many changes and modifications can be made to these details without departing from the nature and the spirit of the invention. Thus it is to be understood that the invention is not limited to these details but is defined by the appended claims.

What is claimed is:

1. A digital computer for executing sequential instructions $I_1, I_2, \ldots I_N$ of a single program in a time-multiplexed fashion, said digital computer being comprised of:

a memory means in which each of said sequential instructions is represented by respective first, second, and third sets of microcommands and where said first set of microcommands for any particular one of said sequential instructions must be executed before said second set of microcommands for that same instruction which in turn must be executed before said third set of microcommands for that same instruction;

means for reading from said memory means the third set of microcommands for instruction $I_{i-3}$, the second set of microcommands for instruction $I_{i-2}$, and the first set of microcommands for instruction $I_{i-1}$, where i is an integer; and a control means for executing said third set of microcommands for instruction $I_{i-3}$, subsequently executing said second set of microcommands for instruction $I_{i-2}$, and subsequently executing said first set of microcommands for instruction $I_{i-1}$;

said means for reading and said means for executing including means for performing their respective operations in a repetitive fashion with the subscript i being incremented each time by 1.

2. A digital computer according to claim 1 and further including a stack means coupled to said control means for pushing data into the stack and popping data from the stack in response to said microcommands; said stack means being comprised of first and second portions wherein pop operations on said first stack portion are specified by microcommands in said first set, push operations on said first stack portion and pop operations on said second stack portion are specified by microcommands in said second set, and push operations on said second stack portion are specified by microcommands in said third set.

3. A digital computer according to claim 1 and further including a storage means for storing said sequential instructions, and wherein said control means is comprised of first, second, and third register means which are coupled to said storage means and are serially coupled to each other for receiving and holding portions of said instructions $I_{i-1}$, $I_{i-2}$, and $I_{i-3}$ respectively, and wherein each of said register means is coupled to a respective memory means for converting the instruction in the register means to which it couples to the beginning addresses for the microcommands in a respective one of said sets.

4. A digital computer according to claim 1 and further including a storage means for storing said sequential instructions, and wherein said control means is comprised of first, second, and third register means with said first register means being coupled to said storage means and to another memory means for converting instruction $I_{i-1}$ to the beginning addresses for the microcommands in said first set, and wherein said second and third register means couple through an arithmetic means to said first register means to receive therefrom the beginning addresses of the microcommands in said second and third sets.

5. A digital computer according to claim 1 wherein said memory means further includes a common set of microcommands for fetching said instructions, and wherein said control means executes said common set of microcommands as part of said iterative sequence.

6. A digital computer according to claim 1 wherein said second set of microcommands for instruction $I_{i-2}$ are executed immediately after the execution of said third set of microcommands for instruction $I_{i-3}$, and said first set of microcommands for instruction $I_{i-1}$ are executed immediately thereafter.

7. A digital computer according to claim 1 wherein said second instruction follows immediately after said first instruction in said program, and said third instruction follows immediately after said second instruction.

8. A digital computer according to claim 1 wherein said microcommands in said first set are different for one pair of said instructions $I_{i-1}$, $I_{i-2}$ and $I_{i-3}$, said microcommands in said second set are different for another pair of said instructions $I_{i-1}$, $I_{i-2}$ and $I_{i-3}$, and said microcommands in said third set are different for still another pair of said instructions $I_{i-1}$, $I_{i-2}$ and $I_{i-3}$.

9. A digital computer for executing sequential instructions $I_1, I_2, \ldots I_N$ of one program in a time-multiplexed fashion; said digital computer being comprised of:

a memory means in which the ith one of said instructions $I_1, I_2, \ldots I_N$ is represented by respective first, second, and third sets of microcommands $S_A{}^i$, $S_B{}^i$, $S_C{}^i$ where $1 \leq i \leq N$; and a control means for executing all of said microcommand sets in the repetitive sequence $S_C{}^{i-3}$ followed by $S_B{}^{i-2}$ followed by $S_A{}^{i-1}$ starting with $S_A{}^1$ and ending with $S_C{}^N$.

* * * * *